Aug. 6, 1957     H. W. GRONEMEYER     2,801,556
CONTINUOUS METHOD AND APPARATUS FOR FORMING BALLS
Original Filed Nov. 8, 1948     7 Sheets-Sheet 1

INVENTOR.
HERBERT W. GRONEMEYER
BY
Alfred R. Fuchs
ATTORNEY

Aug. 6, 1957     H. W. GRONEMEYER     2,801,556
CONTINUOUS METHOD AND APPARATUS FOR FORMING BALLS
Original Filed Nov. 8, 1948     7 Sheets-Sheet 2

INVENTOR.
HERBERT W. GRONEMEYER
BY Alfred R. Fuchs
ATTORNEY

INVENTOR.
HERBERT W. GRONEMEYER
BY
Alfred R. Fuchs
ATTORNEY

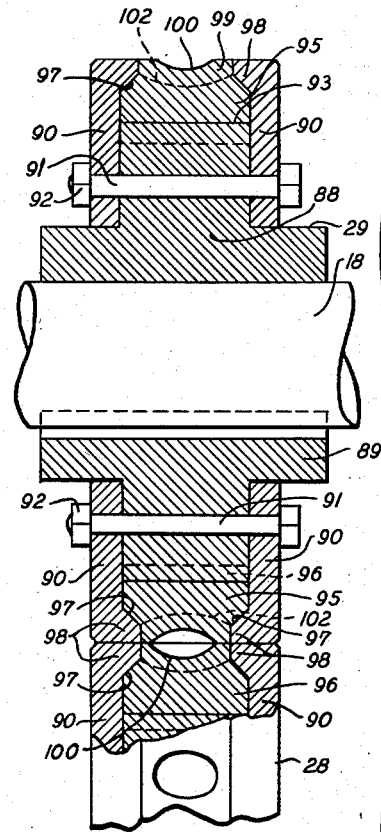
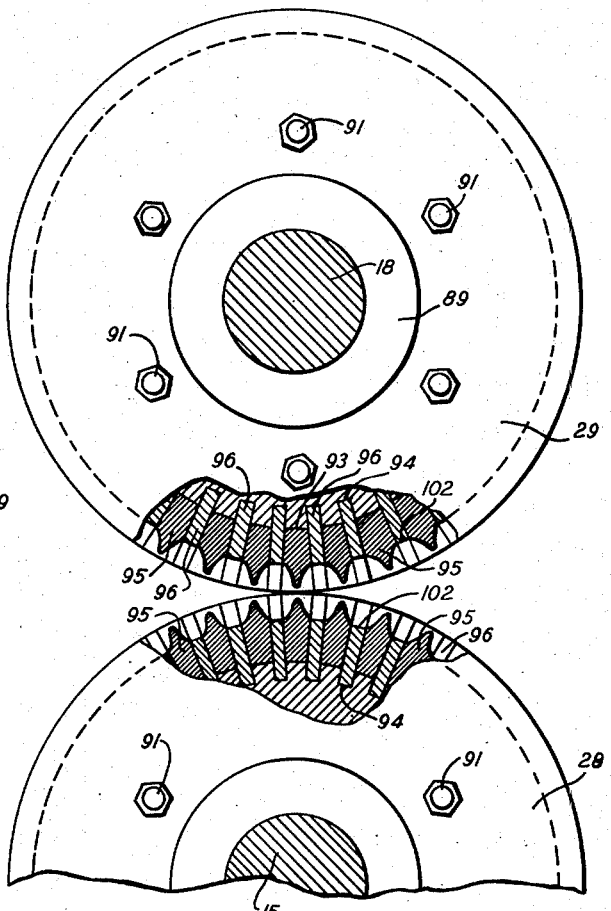
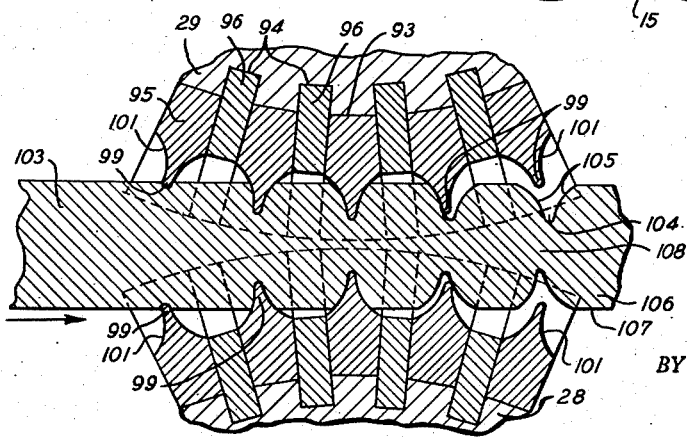

Aug. 6, 1957    H. W. GRONEMEYER    2,801,556
CONTINUOUS METHOD AND APPARATUS FOR FORMING BALLS
Original Filed Nov. 8, 1948    7 Sheets-Sheet 5

INVENTOR.
HERBERT W. GRONEMEYER
BY
Alfred R. Fuchs
ATTORNEY

Aug. 6, 1957     H. W. GRONEMEYER     2,801,556
CONTINUOUS METHOD AND APPARATUS FOR FORMING BALLS
Original Filed Nov. 8, 1948     7 Sheets-Sheet 6

INVENTOR.
HERBERT W. GRONEMEYER
BY
Alfred R. Fuchs
ATTORNEY

INVENTOR.
HERBERT W. GRONEMEYER
BY
*Alfred R. Fuchs*
ATTORNEY

United States Patent Office 2,801,556
Patented Aug. 6, 1957

2,801,556

CONTINUOUS METHOD AND APPARATUS FOR FORMING BALLS

Herbert W. Gronemeyer, near Kansas City, Mo., assignor, by mesne assignments, to Armco Steel Corporation, a corporation of Ohio Continuation of abandoned application Serial No. 58,933, November 8, 1948. This application May 24, 1954, Serial No. 431,874

7 Claims. (Cl. 80—24)

My invention relates to a method and apparatus for forming balls, and more particularly to a continuous method and apparatus for forming grinding balls. This is a continuation of my application Serial No. 58,933, filed November 8, 1948, and now abandoned, on Continuous Method and Apparatus for Forming Balls.

The principal purpose of my invention is to shape grinding balls or similar steel balls out of a piece of rod by a continuous process. In making grinding balls this ordinarily is done by a process that involves cutting off pieces of rod of the proper length for blanks from which the grinding balls are forged. In the usual method utilized for making grinding balls the cut off mechanism and forging mechanism of the machine have to reciprocate and this limits the speed at which the balls can be made.

In view of the large demand for grinding balls and the fact that grinding balls have to be made as cheaply as possible, it is highly desirable that the grinding balls be made rapidly and, preferably, by a continuous process.

More specifically my continuous method of forming grinding balls from steel rods comprises the feeding of the said rods first between a pair of rolls that partly deform the rod so as to form uniformly spaced swages in the rod whereby the rod is changed in shape from a rod-like member circular in cross section, or substantially cylindrical character, to a series of uniform size, uniformly spaced slugs or metallic bodies connected by means of connecting portions that are relatively thin in one direction and extend substantially to the full diameter of the rod from which the balls are to be formed in the direction at right angles thereto, and then passing the rod with the swages provided therein between another pair of rolls rotating about axes perpendicular to the axis of the first set of rolls, which second set of rolls swage the partly formed rod-like member at points substantially 90° around the rod from the first swaging operation at the same points along the rod at which the first swaging operation was performed to form the slugs into substantially ball-like or spherical members having thin connecting portions between them so that as said rod-like member passes from the second set of rolls it has been formed into a series of connected spheres or balls, which are moved along as a unit due to the fact that the same are connected with each other.

It is a further important purpose of my invention to provide a new and improved method of forming steel balls, such as grinding balls, by first swaging a rod-like member at spaced points along its length and then at the same spaced points at a point 90° around the rod-like member from the first swaging operation and successively cutting off the balls from the connected series or string of balls discharged from the second set of rolls, while the connected balls are moving through the machine at a uniform rate, said cutting means moving along with the connected series of balls as it performs its cutting off operation.

The balls formed by my improved machine are given a finishing operation by being placed in the usual sizing machine, preferably, immediately after being cut off, so as to make a more nearly true sphere of the same, as there will be small flats on the balls where the connecting portions were cut off. The sizing machine is a well known apparatus for finishing the balls so as to make the same more truly spherical, such as shown in the patent to Brandt and Bockting on Ball Rolling Machine, No. 2,178,031, patented October 31, 1939.

No complex feeding mechanism is necessary in my improved ball forming machine, as the rod-like member, which is heated to the proper temperature for forming before passing between the first set of rolls, will be indented or swaged by the first set of rolls so that the rolls and the rod will mesh in a similar manner to gears meshing with a rack, the rotation of the rolls thus determining the rate of feed of the rod-like member and the rate of feed of the partly formed or swaged rod-like member into the second set of rolls that completes the forming operation, and as the second set of rolls is driven at the same speed as said first set of rolls and the same meshing of the rolls and the rod-like member occurs as the partly formed or swaged rod-like member passes between said rolls and is formed into a series of connected balls thereby, the rate of feed of the connected balls to the cutting mechanism is determined by the rate of rotation of the rolls.

It is a further important purpose of my invention to provide cutting mechanism that is operated in synchronism with the rolls so that said cutting mechanism will move into position to successively cut off the connecting portions between the ball formations or spherical formations while traveling in the same direction as the series of balls is being moved by means of the rolls and at the same speed, so that from the beginning of the cutting operation to it completion the rotating cutter blade and the series of connected balls that are being operated on thereby will move in the direction of feed at the same speed so that there will be no possibility of damage to the rotatable cutter blade by any lateral stress being applied thereto by the moving connected series of balls.

It is a specific purpose of my invention to provide cutting mechanism for separating a connected series of ball formations so as to form separate balls therefrom, which is mounted to swing through a small arc about a center perpendicular to and spaced from the moving series of connected balls while in cutting engagement with said series of balls and to move in a planetary path about an axis parallel to the axis of the moving series of connected balls so as to move into engagement with the connecting portions between the balls to cut through the same and then promptly move out of the path of said balls, said cutter member having a rotation about its own axis during such movement and also an oscillation in said arcuate path so that said cutter member will return to proper position for separating the balls from each other after having moved along with the connected series of balls during the cutting operation. My Patent No. 2,700,909, patented February 1, 1955, discloses a continuous method and apparatus for making grinding balls which involves the same forming steps as that disclosed herein, but uses a method of separating the ball formations avoiding the reciprocating motions necessary in the use of the cutting mechanism hereinbefore referred to.

Other objects and advantages of my invention will appear as the description of the drawings proceeds. I desire to have it understood, however, that I do not intend to limit myself to the particular details shown or described, except as defined in the claims.

In the drawings:

Fig. 5 is a detail transverse sectional view through one of the rolls, showing a fragment of the cooperating roll.

Fig. 6 is a view in side elevation of the cooperating roll shown in Fig. 5, partly broken away.

Fig. 7 is a fragmentary detail sectional view lengthwise through the rod, showing the swaging dies cooperating therewith to perform the first operation on the rod.

Figure 1:
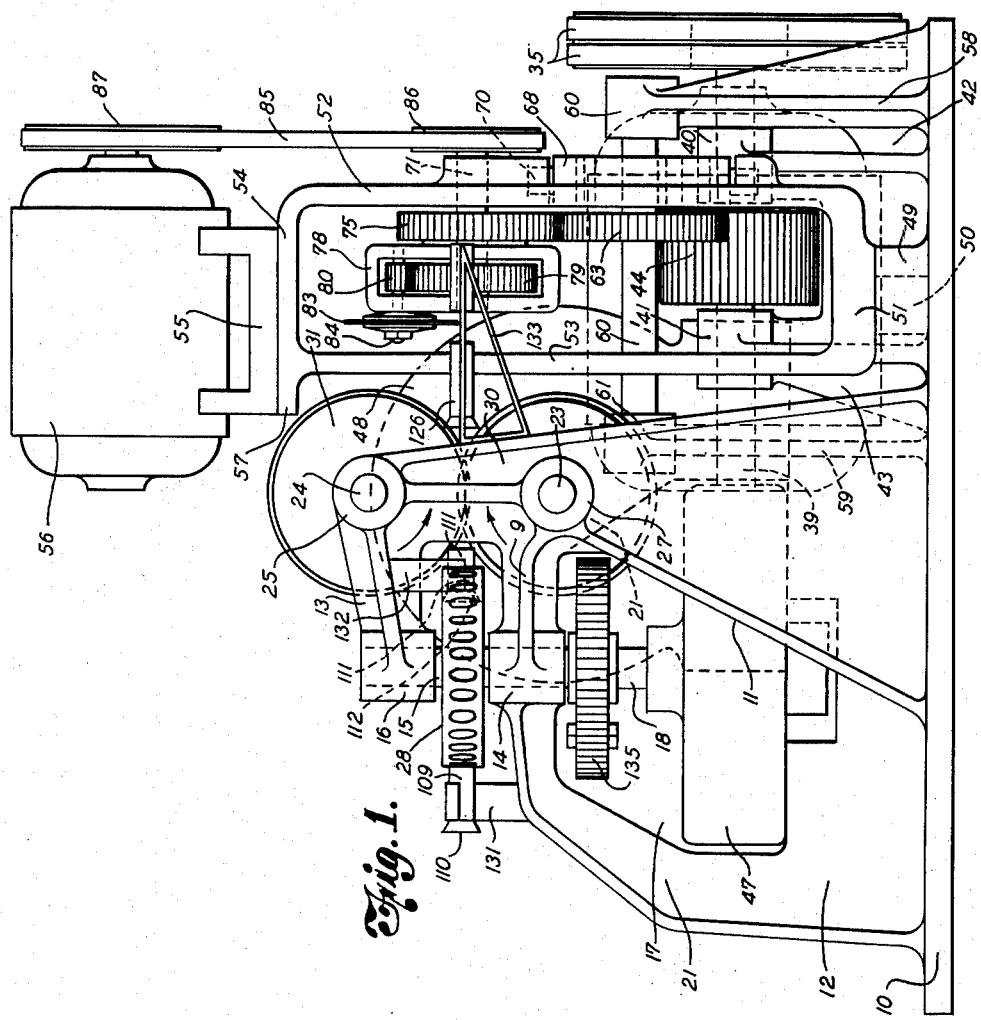
Fig. 1 is a view in side elevation of my improved ball forming apparatus.

Referring in detail to the drawings, my improved ball forming machine is provided with a base 10, from which the frames 11 and 12 extend upwardly. The frame 11 has a pair of laterally projecting arms 9 and 13 thereon and the arm 9 has a bearing 14 for the vertical shaft 15, while the arm 13 has a bearing 16 for said shaft. The frame 12 has an opening 17 therein and the shaft 18 is similarly mounted to the shaft 15, there being an arm 19 on the frame 12 corresponding to the arm 13 on the frame 11 having a bearing 20 on the end thereof for the upper end of the shaft 18. The lower bearing for the shaft 18 corresponding to the bearing 14 for the shaft 15 is mounted in horizontal alignment therewith at the convergence of the arms 21 of said frame 11. The frame 11 and the frame 12 are also provided with bearings for horizontal shafts 23 and 24, the bearings 25 and 26 for the upper shaft 24 being shown in Fig. 2. The lower shaft is similarly mounted, the bearing at the end of the shaft corresponding to the bearing 25 being indicated by the numeral 27 in Fig. 1. Mounted to rotate with the shafts 15 and 16 are the rolls or roller dies 28 and 29 and mounted to rotate with the shafts 23 and 24 are the rolls or roller dies 30 and 31.

The shaft 15 has a gear 135 fixed thereto and the shaft 18 has a gear 136 fixed thereto, and the shaft 24 has a gear 137 fixed thereto, while the shaft 23 has a gear 138 fixed thereto. The gears 135 and 137 are adjustable so that the relative position of the die members on the cooperating pairs of rolls 28 and 29, and 30 and 31 can be brought into exact alignment with each other so that the corresponding portions of the dies on the cooperating rolls will be in exact alignment with each other to act on the rod that is to be utilized for making the balls. The gears 135 and 136 and the gears 137 and 138 have the same number of teeth so that as the shafts 23 and 18 are driven the shafts 15 and 24 will also be driven at the same rate of rotation and accordingly the rolls or roller dies mounted on each of said pair of shafts will rotate at the same rate and thus at the same peripheral speed.

The adjustable gears 135 and 137 are similarly constructed and the same reference numerals will be used for corresponding parts on said gears. Each of said gears has a central hub portion 139, which has a flange 140 thereon, which is provided with a slot 141 into which a pin 142 extends, which pin is mounted in fixed position in an opening 143 in the inwardly directed flange 144 provided on the rim portion 145 of said gear. The flange 140 is also provided with a recess 146 therein and a bolt 147 is mounted in fixed position in an opening 148 in the flange 144.

A block 149 is mounted on the bolt 147 in the recess 146, said block having a convex outer face 150 and a flat face 151 opposite said convex face and a pair of flat faces 152 extending perpendicularly to the flat face 151. The recess 146 has a concave wall having the same curvature as the convex face 150 and has side faces 153, which extend parallel to the side faces 152. Shims 154 are provided between the faces 152 and 153 for adjusting the position of the block 149 relative to the recess 146 and thus of the bolt 147 relative to the recess and consequently the position of the rim member 145 relative to the hub member 139. After the proper number of shims 154 have been placed on opposite sides of the block 149 to adjust the gear 135 relative to the gear 136 or the gear 137 relative to the gear 138 the nut 155 is tightened down on the block 149 to clamp the parts in adjusted position. The gears 136 and 138 and the rim portions of the gears 135 and 137 are provided with gear teeth 156 that are all of the same character.

A motor 32 is mounted on the base 10 and is provided with a plurality of pulleys 33 over which the drive belts 35 operate. Said belts also operate over the pulleys 37 on a shaft 39, which is mounted in suitable bearings 40 and 41 provided on standards 42 and 43 that extend upwardly from the base 10. A wide faced gear 44 is fixed on the shaft 39 and has a gear 45 meshing therewith, which is mounted on a shaft 46 to rotate therewith. The shaft 39 also is the input shaft of a reduction gearing 47, which has the output shaft 18. The shaft 46 is the input shaft of a reduction gearing 48 that has the output shaft 23. The direction of rotation of the shaft 39 is such that the roll 29 will be rotated in the direction indicated by the arrow thereon in Fig. 2 and the cooperating roll will be driven in the direction indicated by the arrow thereon in said figure. Also the direction of rotation of the shaft 23 will be such that the roll 30 will rotate in the direction indicated by the arrow thereon in Fig. 1 and the cooperating roll 31 will rotate in the direction indicated by the arrow thereon in said figure.

An upstanding bearing socket 49 is provided on the base member 10 in which a depending pivot projection 50 is swively mounted, said depending pivot projection being provided on a frame 51 that has a pair of upstanding arms 52 and 53 thereon connected at the top thereof by a transverse portion 54, which has a mounting 55 provided thereon for a motor 56, there being a lateral extension 57 on the frame 51 to provide sufficient support for the motor mounting 55. A pair of bearing standards 58 and 59 also extend upwardly from the base 10, said bearing standards having bearings 60 and 61 at their upper ends for a shaft 62, which shaft has a gear 63 fixed thereon to rotate therewith that meshes with the wide faced gear 44. The shaft 62 extends through a large opening 64 in the upstanding arm 53 and has an eccentric 65 thereon that is mounted in a slide 66.

The slide 66 is mounted in a rectangular opening or slideway 67 in a supplemental frame 68, which is provided with pivot members 69 and 70 to mount said frame for pivotal or swiveling movement about a vertical axis, the entire swiveled frame 68 being mounted in an opening in the member 52 of the frame 51.

The mounting of the frame 51 and of the supplemental frame 68 and the slide 66 is such that when the eccentric 65 rotates with the shaft 62 the slide 66 will slide up and down in the slideway 67 in the swiveled frame 68, but when the eccentric reaches such a position as to move the slide 66 laterally of the shaft 62 in either direction, then the frame 51 must turn about the pivot or swivel 50 to allow for this. As a result the frame has an oscillating movement about the axis of the pivot 50, the swivel member 69 permitting such movement and the teeth of the gears 44 and 63 having enough clearance to permit the small amount of oscillation that will take place that close to the pivotal axis of the frame 51.

A shaft 71 is mounted in suitable bearings 72 and 73 in the frame members 52 and 53. A rotatable member 74 is mounted on the shaft 71 and has gear teeth 75 thereon meshing with the teeth of the gear 63. A bearing sleeve 76 is provided for mounting the member 74 for rotation on the shaft 71. Also a bearing member 77 is provided to permit such rotation. Rotation of the shaft 62 will drive the gear 63 and rotate the rotatable member 74. The rotatable member comprises a hollow casing 78 that has mounted within the same a gear 79, said gear being fixed on the shaft 71. The gear 79 meshes with a gear 80 fixed on a shaft 81, which is mounted in suitable bearings in the hollow casing 78 of the member 74. A rotatable cutter member 82 having a circular cutting blade 83 is fixed on the shaft 82 in any suitable manner, as by means of the nut 84.

It will accordingly be seen that the rotatable cutter member 83 rotates about the shaft 81 when the shaft 71 is driven. Said shaft 71 is driven from the motor 56 by means of the belt 85, which passes over the pulley 86 fixed on the shaft 71 and over the pulley 87 of the motor 56. The rotation of the member 74, due to the rotation of the shaft 62, will cause the shaft 81 about which the cutter blade 83 rotates, to revolve around the shaft 71. At the same time the entire frame 51 on which the member 74 and the rotating cutter member 83 are mounted oscillates about the axis of the pivot 50 as the shaft 62 rotates. As a result the cutter member will have a planetary movement about the axis of the shaft 71, as well as a rotation about its own axis and will also move with the frame 51 about the pivot 50 as an axis in an arc so as to oscillate about the axis of said pivot as a center.

Figure 2:
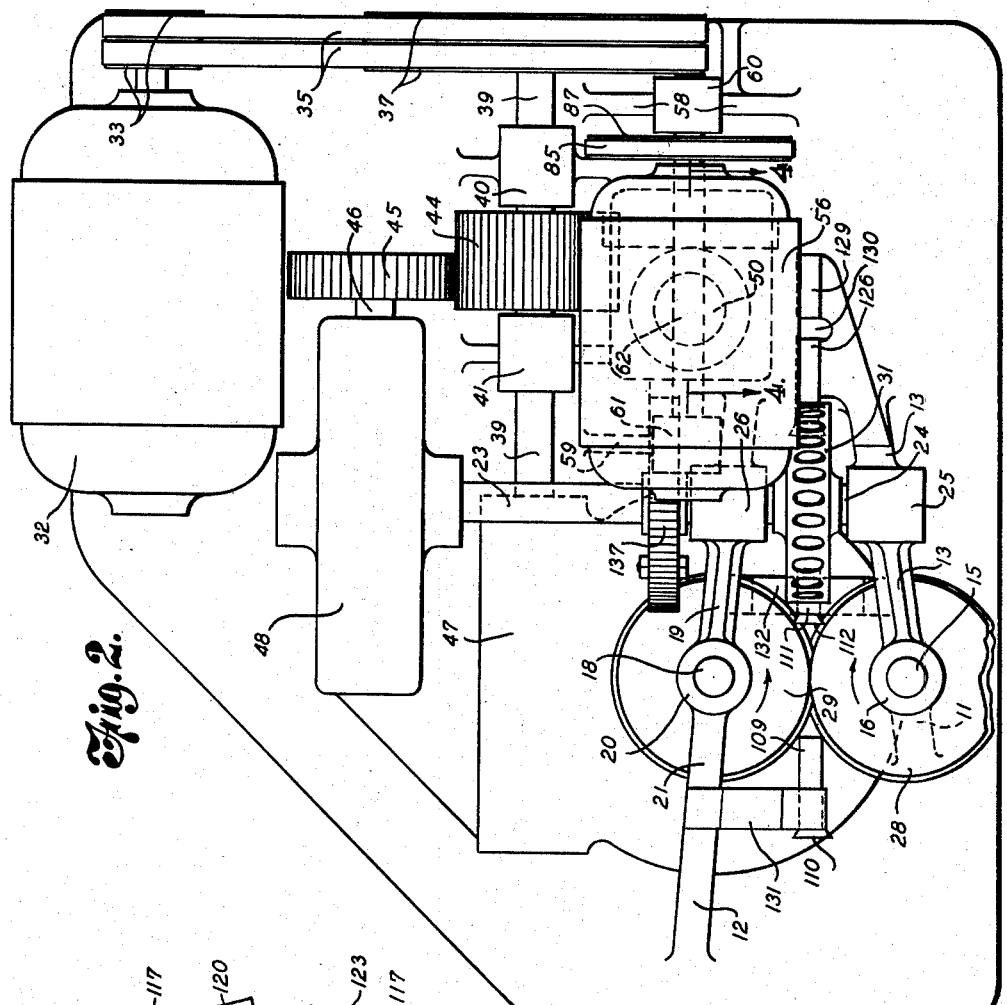
Fig. 2 is a plan view thereof.

The gear arrangement and the timing of the mechanism is such that the oscillating movement of the cutter member 83 to the right as viewed in Fig. 1 will take place during the movement of the cutter member 83 about the shaft 71 outwardly from between the legs 52 and 53 of the upstanding frame 51 into engagement with the series of ball shaped or spherical formations connected together by narrow neck portions and this movement toward said swaged rod will take place when the cutter member 83 is opposite one of the narrow connecting neck portions, thus causing the severance of such neck portion and the separation of the forwardmost ball formation from the series that has been formed on the rod-like member. After the cutting movement has taken place the planetary motion of the rotatable circular cutter member 83 will continue so that the same moves back into position between the frame members 52 and 53 and the return oscillating motion due to the eccentric 65 will take place after the cutter member 83 has withdrawn from the work and the cut-off operation is completed, so that the oscillating frame will move the cutter member back into position ready to move toward the swaged rod to cut off the next ball formation. The gear drive for the shaft 62 and for the rotatable member 74 is such that the movement of the cutter blade 83 in the direction of feed of the rod that has been swaged will be at exactly the same rate as the discharge rate of the swaged rod with the ball formations thereon as it leaves the second set of rolls 30 and 31.

The rolls 28 and 29 are identical in structure and are shown more in detail in Figs. 5, 6 and 7. Each of said rolls comprises a body portion 88, which has a hub portion 89 mounted on the shaft to which the roll is fixed. The body portion has a pair of side plates 90 fixed thereto by means of bolts 91 and nuts 92. The body portion 88 has a cylindrical periphery 93, which is provided with a series of recesses 94 herein. Die members or die blocks 95 are mounted in position on the cylindrical periphery 93, and filler members 96 seat in the recesses 94 and alternate with the die members 95. The die members 95 are provided with inclined shoulders 97 thereon that seat against inclined faces on the inwardly directed flanges 98 provided at the peripheries of the side plates or flanges 90, thus holding the die members 95 and the filler members 96 in position. The die blocks or die members 95 are made of high grade tool steel and are hardened so as to be capable of performing their swaging operation. Each of said die members 95 is provided with a central projection 99, which is transversely concave, as indicated at 100 in Fig. 5. These are also curved on an arc at the sides thereof as shown at 101 in Fig. 7. The concavity extends downwardly along the concave sides 101 of the projections 99. Thus the forward and rear walls of the projections 99 are compoundly curved. The filler members 96 are merely curved on an arc crosswise of the same, as indicated by the dotted line 102 in Fig. 5, the curved surfaces 102 of the filler members being cylindrical. Said filler members are shouldered similarly to the die members 95, but are made of softer, less expensive steel than the die members 95, as there is no appreciable wear on these.

It will be noted upon reference to Fig. 7 that the rod-like member 103, which moves in the direction indicated by the arrow thereon in Fig. 7, will pass between the rolls 28 and 29, being heated to a suitable temperature to permit swaging of the same, and the projections 99 on the die members 95 will gradually enter the material of the rod-like member 103 on the opposite sides thereof to form swages 104. The result is that a series of slugs 106 is formed on the rod, which have the convexly curved wall portions 105 and substantially cylindrical portions 107 at the apexes thereof. These slugs are connected by means of narrow connecting neck portions 108.

Figure 8:
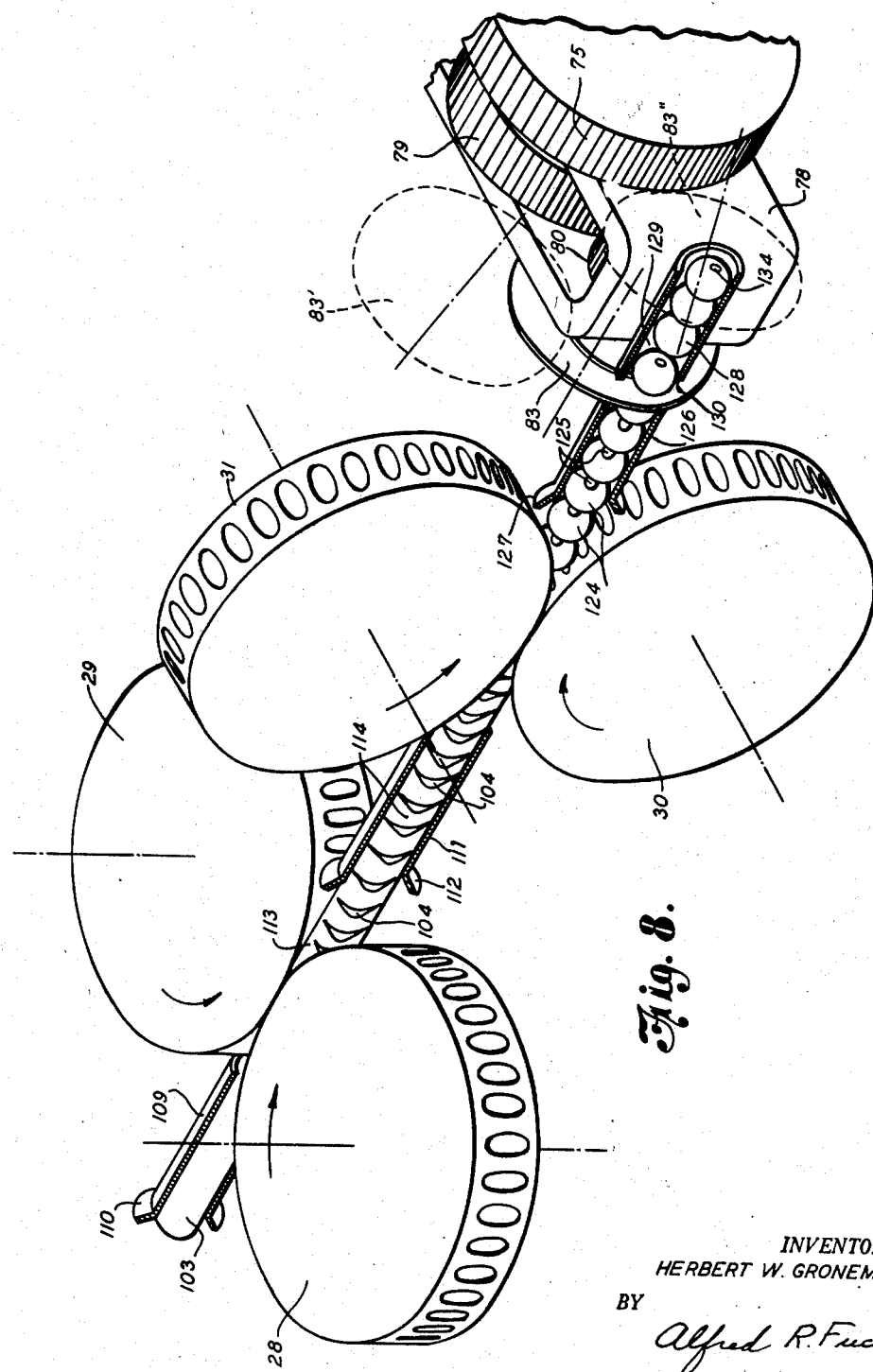
Fig. 8 is a diagrammatic view in perspective, showing the various steps in my ball forming method and the cut-off mechanism.
Figure 11:
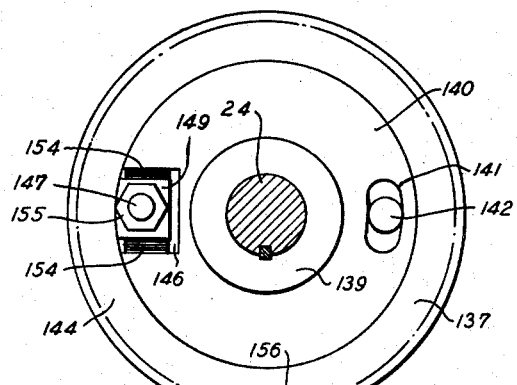
Fig. 11 is a detail vertical sectional view showing the gears for driving the pair of rolls that rotate about horizontal axes.
Figure 14:
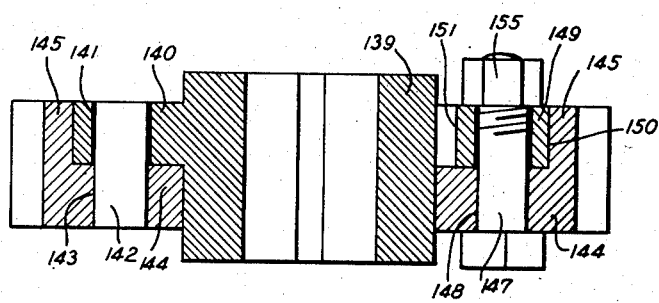
Fig. 14 is a section taken on the line 14—14 of Fig. 13.
Figure 13:
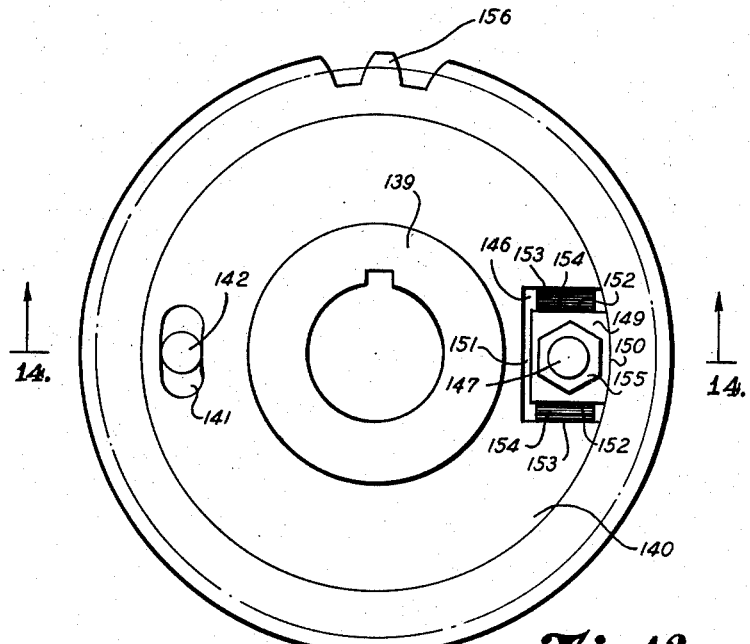
Fig. 13 is a face view of one of the adjustable gears.
Figure 12:
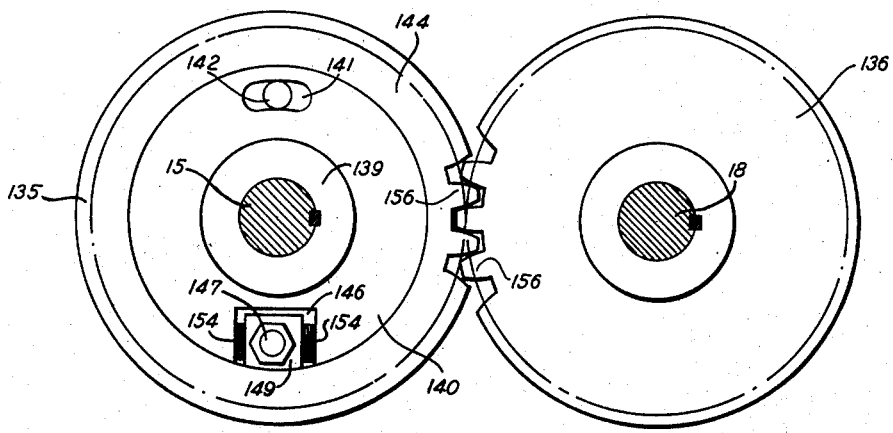
Fig. 12 is a detail horizontal sectional view showing the gears for driving the pair of rolls that rotate about vertical axes.

In Fig. 8 the rolls 28 and 29 are shown diagrammatically. Means is provided for guiding the rod-like member 103 into the rolls 28 and 29, preferably, comprising a tubular guide member 109 having a flaring entrance 110 and aligning with the bite of the rolls 28 and 29. Also a tubular member 111 is provided on the exit or discharge side of the rolls 28 and 29, which has a flaring entrance end 112 to guide the rod 103, after having been swaged by the rolls 28 and 29, into proper relationship with the rolls 30 and 31, the rolls rotating in the direction indicated by the arrows in Fig. 8. The swages 104, it will be noted, extend only part way around the rod, there being some unswaged portions at 113. Also it will be noted that the formations or slugs resulting from the swaging are almost of a rectangular character, and are slightly narrower at the center portions 114 thereof due to the curved character of the die projections 99.

Figure 9:
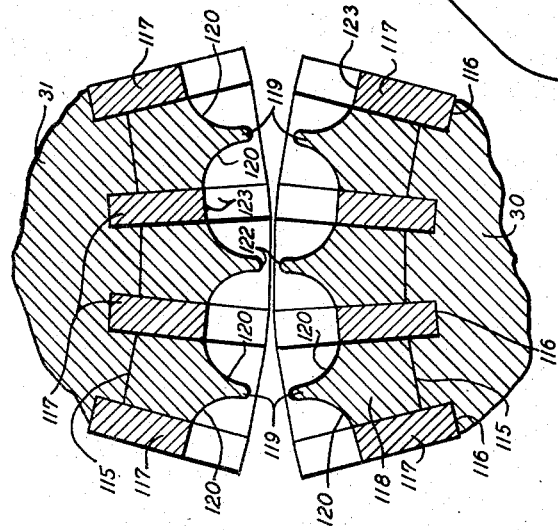
Fig. 9 is a fragmentary sectional view of the second set of rolls.
Figure 4:
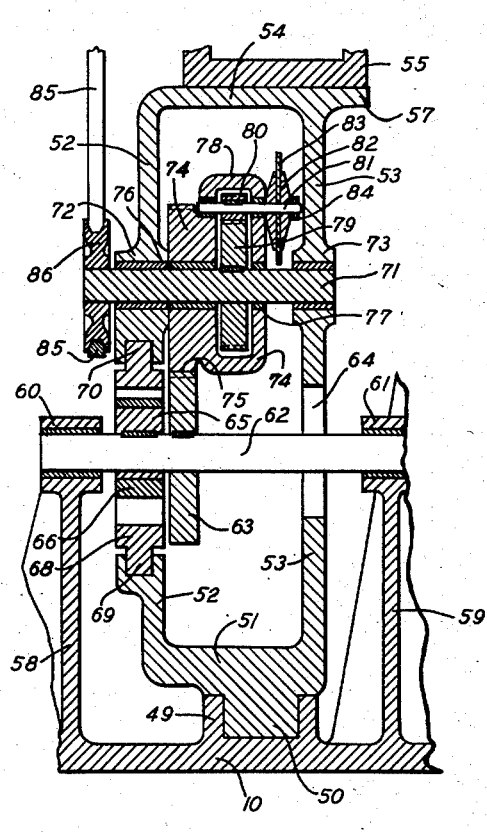
Fig. 4 is a fragmentary sectional view taken on the line 4—4 of Fig. 2.
Figure 3:
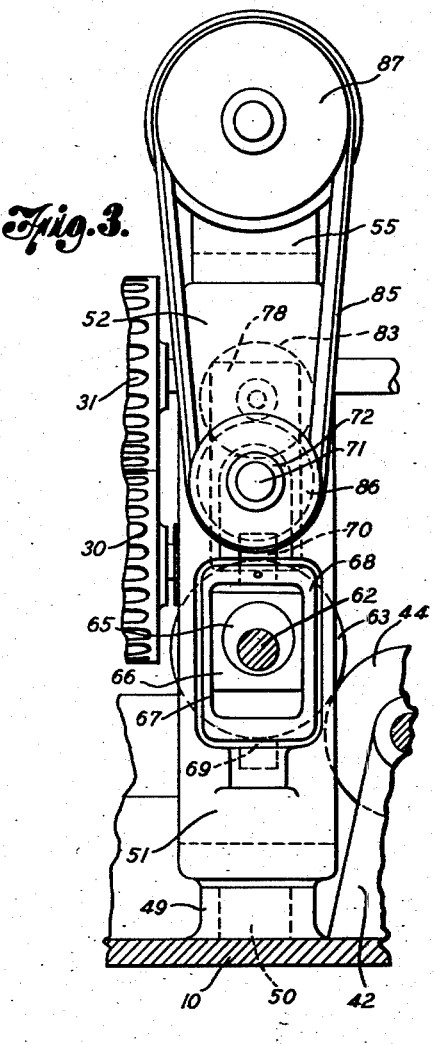
Fig. 3 is a fragmentary elevational view partly in section.
Figure 10:
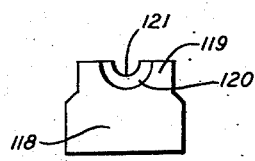
Fig. 10 is a side elevation of a die of said second set of rolls.

The rolls 30 and 31 are similar in construction to the rolls 28 and 29 and the die members and filler members are secured in position in the same manner as in the rolls 28 and 29. However, the dies are of a different shape than those used in the rolls 28 and 29 in order to shape the ball formations on the rod as the second swaging or forming operation is performed thereon. Said rolls 30 and 31 are provided with peripheral walls 115 lying on the surface of a cylinder and having recesses 116, in which the filler members 117 are mounted. The die members 118 are mounted in the same manner as the die members 95, but have projections 119 that are concavely curved on opposite sides thereof, as shown at 120 in Fig. 9, and the curvature of the sides of the projections 119 being on an arc of somewhat greater radius than the arc of the concave curvature of the sides 101 of the projections 99. Transversely, the projections 119 are concavely curved as indicated at 121 in Fig. 10, the radius of curvature of the concavity 121 being much smaller than that of the concavity 100 and being of the radius of the ball that is to be formed. The radius of the compoundly curved walls of the projections 119 is that of the sphere or ball that is to be formed, in all directions, so that as the rolls 30 and 31 act on the swaged rod to complete the forming of the ball-like or sphere formations thereon the dies will form or shape the rod so that there are substantially spherical projections thereon, which are connected by narrow neck portions of a diameter equal to the spacing of the apexes 122 of the projections 119. The filler members 117 are transversely curved on the surface of a cylinder at the outer ends 123 thereof.

Inasmuch as the rods are extended when the swaging operation is performed thereon by the first set of rolls 28 and 29, the second set of rolls must be made of larger diameter than the first set of rolls to compensate for this increase in length of the rod-like member. A further extension of the rod-like member takes place in passing through the second set of rolls and in providing for the movements of the circular cutter member 83, this extension of the rod-like member must also be taken into consideration. The spherical or ball formations are indicated in Fig. 8 by the numeral 124 and the narrow neck portions connecting the ball formations 124 by the numeral 125. The guide tube 126 is provided, having a flaring entrance 127, for guiding the connected ball formations 124 into position to be acted on by the circular cutter blade 83. The cut off balls are indicated by the numeral 128 in Fig. 8 and a guide tube 129 is provided to support the ball that is being cut off and to guide the separated balls out of the machine, there being a gap at 130 between the guide tubes 126 and 128 of a length slightly greater than the lateral movement of the cutter member 83 during its cutting operation.

In Fig. 8 the movements of the cutter member 83 are shown diagrammatically. At 83′ the cutter member is shown in its retracted position and at 83 it is shown in its position in which it has just cut through the connecting neck portion 125. In the dotted position 83″ the cutter member has reached the limit of its lateral motion or oscillation in one direction and has completed the cutting operation and has moved away from the axis of the tubular guide members sufficiently that it will clear said tubular guide members and return to the position 83′ for beginning another oscillation in a direction parallel to the direction of feed of the rod-like member 103 through the machine.

The tubular guide members 109, 111, 126 and 129 are mounted in any suitable manner on the frame of the machine, a bracket 131 being provided for mounting the guide member 109, a bracket 132 for mounting the guide member 111, and a bracket 133 being provided for mounting the guide members 126 and 129.

In operation, the rod 103 is fed into engagement with the rolls 28 and 29 through the guide tube 109, the rolls 28 and 29 forming the swages 104 in the rod-like member 103 and slightly extending the same in length, the swaged rod-like member being fed by the rotation of the rolls 28 and 29 into engagement with the rolls 30 and 31, which form the ball formations 124 on the rod-like member, the rod-like member now becoming merely a series of spherical or ball formations 124 connected together by narrow neck portions 125. As each ball formation 124 passes from the guide tube 126 into the guide tube 128 the rotating cutter member 83 moves into engagement with the neck portion 125 and passes through the same as the cutter member 83 moves laterally at the same rate as the connected series of ball formations 124 are moving due to the action of the rolls 28 and 29, and 30 and 31. As a result, the balls are separated by a clean cut and the resulting ball 128 has a very slight flat 134 formed thereon where the cutting operation was performed. These flats are removed by running the balls through a sizing machine referred to herein. It will be noted that the rolls 28 and 29 act on the opposite sides of the rod-like member 103 and the rolls 30 and 31 on the top and bottom sides of the swaged rod where the unswaged portions 113 lie. Thus the rolls 30 and 31 act substantially at 90° around the rod 103 from the rolls 28 and 29 in performing their forming operation. The length of the neck portions is slightly exaggerated in Fig. 8 to more clearly show the same.

What I claim is:

1. In a ball forming machine, rolls having a body portion, die members having wedge shaped body portions and filler members having a body portion complementary to said die body portions, said dies and fillers being arranged in an alternating circumferential series around the periphery of said body portion, said filler members forming part of the die forming surface and being positioned at points of lesser die wear, and flanged rings secured to said body portion and engaging the opposite sides of said die and filler members to retain the same in position on said body portion.

2. In a ball forming machine, rolls having a body portion having uniformly spaced recesses in the periphery thereof, die members having wedge shaped body portions and filler members having a body portion complementary to said die body portions, said dies and fillers being arranged in an alternating circumferential series around the periphery of said body portion, said filler members forming part of the die forming surface and being positioned at points of lesser die wear, said filler members being seated in said recesses and flanged rings secured to said body portion and wedgingly engaging the opposite sides of said die and filler members to retain the same in position on said body portion.

3. In a ball forming machine rolls, each having a body portion having a periphery and opposite side surfaces, die members and filler members alternating with said die members arranged in a circumferential series around the periphery of said body portion, each of said die members and filler members having a working surface and side surfaces, and flanged rings secured to said body portion and engaging the side surfaces thereof, said rings having side surfaces engaging the side surfaces of said dies and filler members, said side surfaces of said rings being complemental to the side surfaces of said dies and filler members engaged thereby and having portions wedgingly engaging the complemental portions of said die and filler members to clamp said die and filler members in position on said body portion.

4. In the method of making steel balls, rolling uniformly longitudinally spaced transversely extending diametrically opposed transversely elongated indentations in opposite sides of a steel rod alternating longitudinally of said rod with partially cylindrical slugs while advancing said rod lengthwise of itself, and rolling connected ball formations on the indented rod by a rolling, swaging action applied to said rod perpendicularly to said first rolling while continuing the advance of said rod lengthwise of itself.

5. The method of making steel balls, comprising forming uniformly longitudinally spaced transversely extending opposed indentations elongated transversely of said rod in opposite sides of a round steel rod alternating longitudinally of said rod with slugs having a substantially cylindrical mid-portion and convexly curved ends, forming uniformly longitudinally spaced closely adjacent ball formations connected by short narrow neck portions on the swaged rod by a swaging action indenting said rod at points transversely aligned with and perpendicular to said elongated indentations, and severing the connecting neck portions between said ball formations.

6. The method of making steel balls, comprising rolling uniformly longitudinally spaced diametrically opposed transversely extending long narrow indentations in opposite sides of a round steel rod alternating with partially cylindrical slugs progressively lengthwise thereof, rolling longitudinally spaced connected ball formations on the indented rod by a progressive rolling swaging action applied to said rod perpendicularly to said first rolling, and successively severing the connecting portions between said ball formations.

7. In the method of making steel balls, rolling uniformly longitudinally spaced diametrically opposed transversely elongated narrow indentations in opposite sides of a steel rod and slugs having partially cylindrical body portions between longitudinally adjacent indentations in said rod while advancing said rod lengthwise of itself, and rolling connected ball formations on the indented rod by a rolling swaging action applied to said rod perpendicularly to said first rolling, including indenting said indented rod between said slugs at 90° around said rod from said elongated indentations at opposed points transversely aligned with said elongated indentations to reduce said elongated indentations to short narrow neck portions while continuing the advance of said rod lengthwise of itself.

References Cited in the file of this patent

UNITED STATES PATENTS 2,269,899  Brandt ---------------- Jan. 13, 1942